Aug. 2, 1949.  F. E. KLING  2,477,623
GAS FILTER
Filed July 12, 1945  3 Sheets-Sheet 1
FIG. 1.
FIG. 2.
FIG. 3.
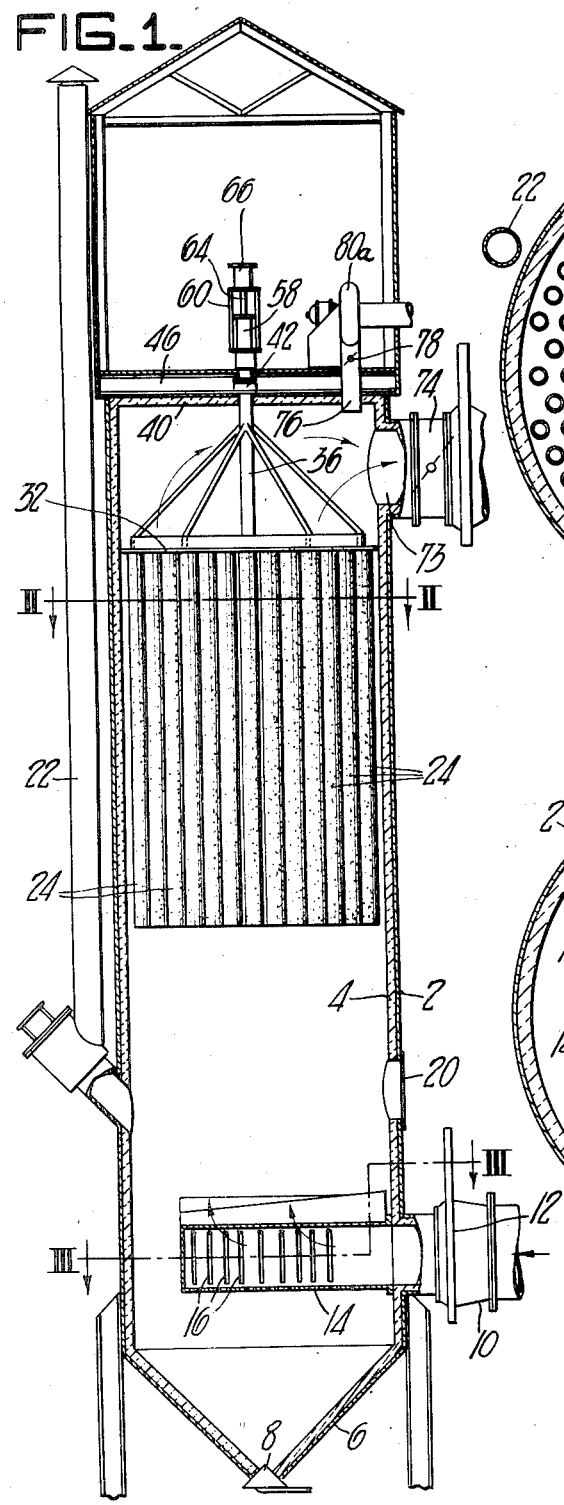
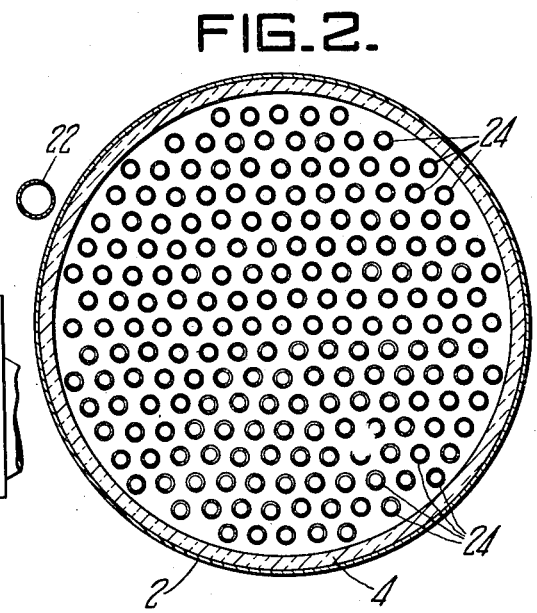
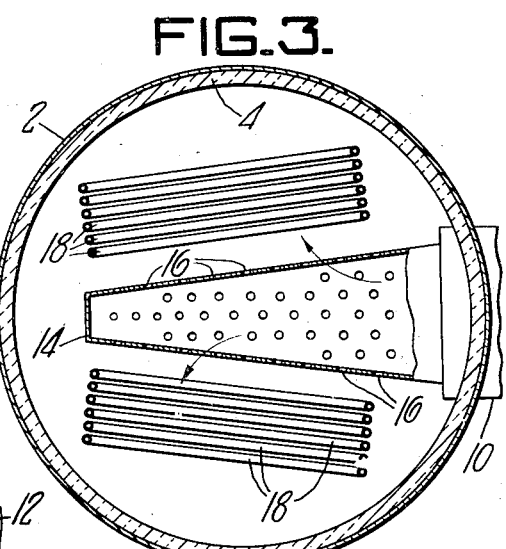
Inventor:
FRED E. KLING,
by John E. Jackson
his Attorney.

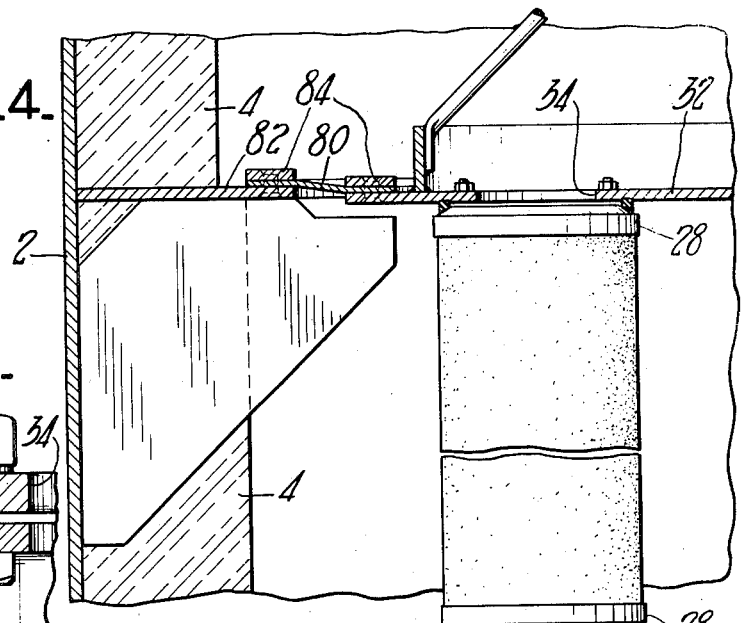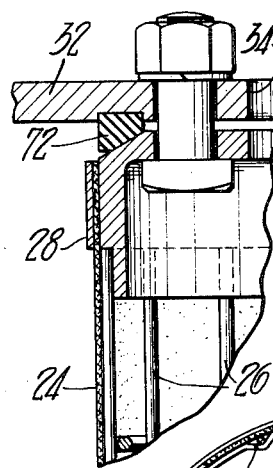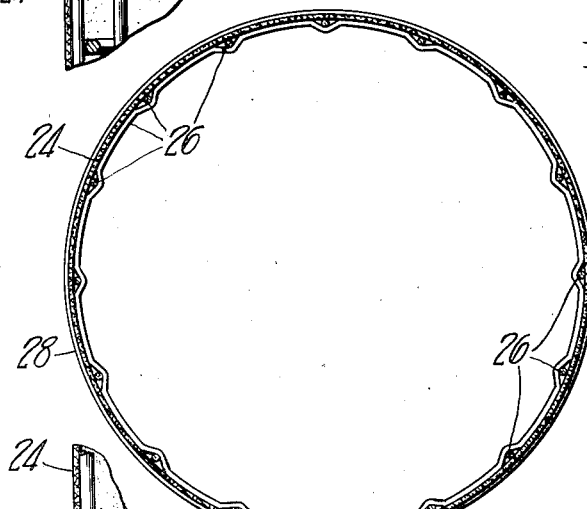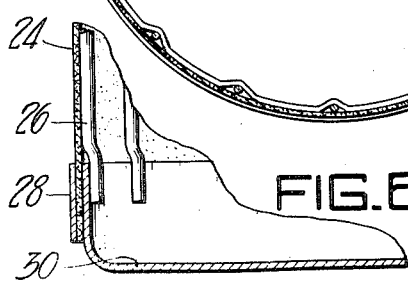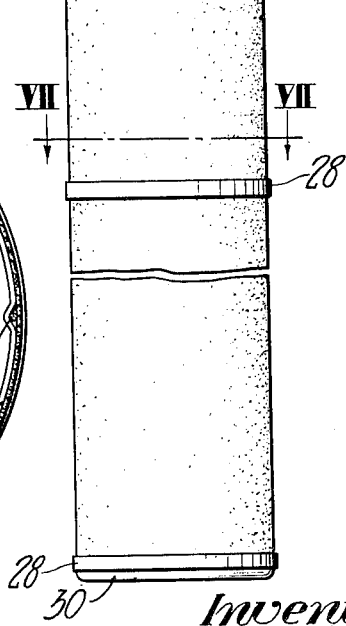

Aug. 2, 1949.   F. E. KLING   2,477,623
GAS FILTER

Filed July 12, 1945   3 Sheets-Sheet 3

Inventor:
FRED E. KLING,
by John E. Jackson
his Attorney.

Patented Aug. 2, 1949

2,477,623

UNITED STATES PATENT OFFICE 2,477,623

GAS FILTER

Fred E. Kling, Youngstown, Ohio, assignor to Carnegie-Illinois Steel Corporation, a corporation of New Jersey Application July 12, 1945, Serial No. 604,681

3 Claims. (Cl. 183—55)

This invention relates to improvements in gas cleaners and more particularly to gas filters adapted to remove flue dust from blast furnace gases and the like.

In blast furnace operations, it is necessary to thoroughly clean the exhaust gases from the blast furnaces in order that the entrained dust may be recovered and returned to the furnace and also to prevent the gases from clogging up and injuring the hot blast stoves and other heating apparatus in which they are used. Such cleaning apparatus has heretofore generally consisted of a primary cleaner, which is a large gravity type dust separator, and a secondary cleaner such as a wet gas washer and electrical precipitators. The electrical precipitators have not proven economical for such use and the wet washers are undesirable for a number of reasons. The temperature of the gas is lowered and thereby the heating efficiency thereof is impaired. Also since water is required, the streams or lakes to which it is returned are polluted and frequently necessitate dredging. Moreover, the alkali content of the wet washed gas is high and very harmful to the hot blast stove checkerwork.

In order to overcome the foregoing disadvantages, dry filters have heretofore been proposed but the operation thereof has been unsatisfactory and uneconomical largely due to short filter bag life. In the conventional circular bag type filter such as used for filtering air and gas at temperature not exceeding 225° F., the bags hang vertically and are fastened at the lower ends to a plate with holes, the size of the bags, which separates the lower or inlet chamber for dirty gas from the upper or outlet chamber for the cleaned gas. The gas enters the lower ends of the bags and passes through same, the dust collecting on the inside. The bags are shaken periodically and the flow of gas is reversed during this period to help separate the dust from the bags, which then drops to the bottom of the lower chamber, usually having a hopper shape. The disadvantages of this arrangement are that the bags stretch in time and then sag and fold or wrinkle at the lower ends, which reduces the life of the bags and renders the shaking action ineffective at the lower ends of the bags. When the flow of gas is reversed during the shaking period, the bags collapse and fold, reducing the life of the bags thereby. This has been especially serious when trying to use a filter of this type for cleaning blast furnace gas of a temperature higher than 225° F. for which a fabric of asbestos and/or glass fiber has to be used, which are very susceptible to wrinkling, resulting in disintegration of the cloth in a short time. Moreover, the bags are not accessible individually for inspection and replacement.

It is accordingly an object of the present invention to provide a dry filter for blast furnace gases that is simple and rugged in design and economical to operate.

It is another object to provide a mounting for the filter members in dry gas filters that improves the service life of the filter members.

It is a further object of the present invention to provide a dry gas filter in which the filter members are readily available for inspection and replacement.

The foregoing and further objects will be apparent from the specification and drawings, wherein:

Figure 1 is a vertical section of a gas filter embodying the teachings of my invention;

Figure 2 is a section on line II—II of Figure 1;

Figure 3 is a section on line III—III of Figure 1;

Figure 4 is a view of the filter bag suspension mechanism, and diaphragm between lower and upper chambers, partly in section;

Figure 5 is an enlarged detail of the top of a bag assembly;

Figure 6 is an enlarged detail of the bottom of a bag assembly;

Figure 7 is a section on line VII—VII of Figure 4; and

Figure 8:
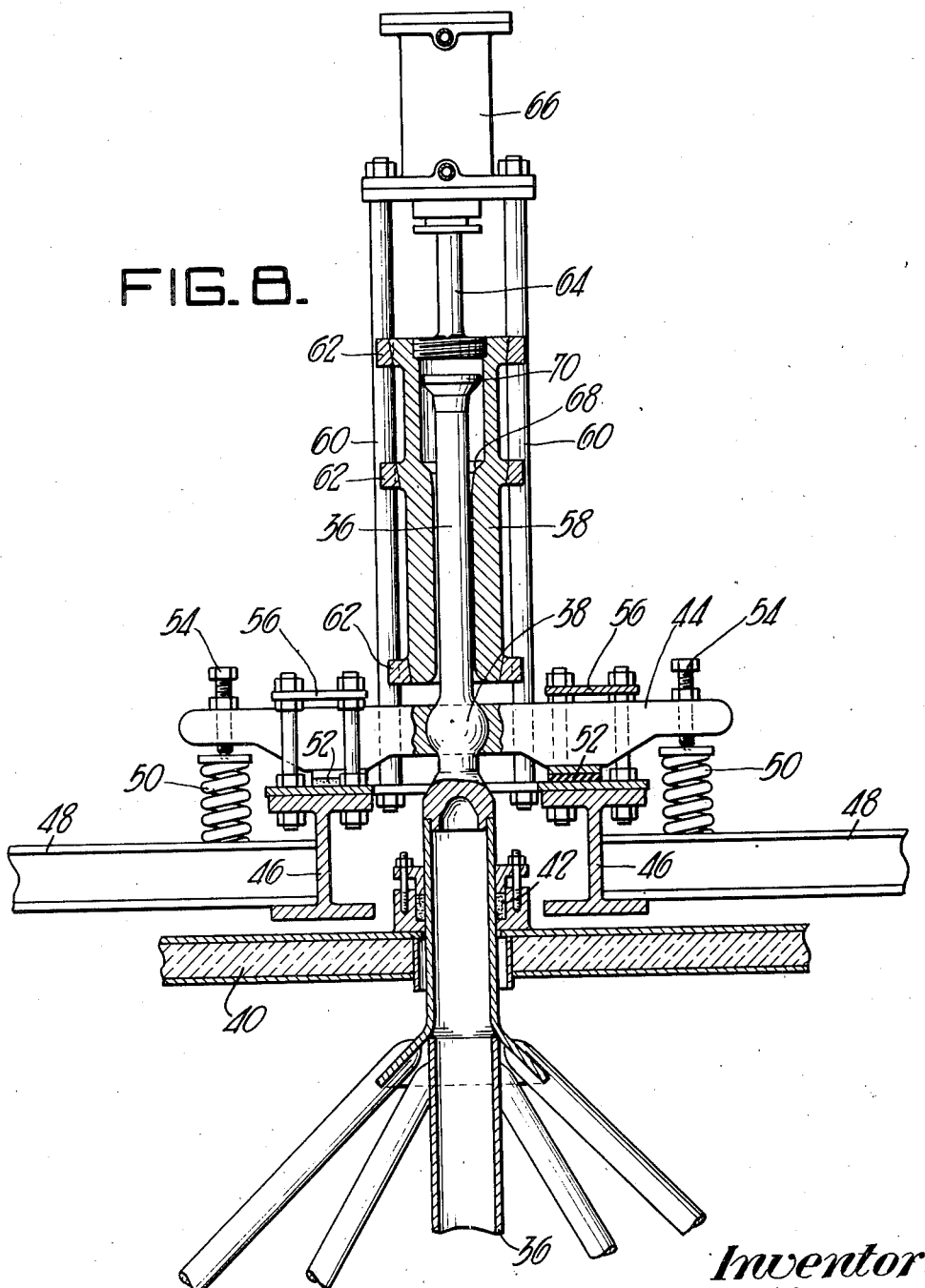
Figure 8 is a vertical section of the suspension and shaking mechanism.

Referring more particularly to the drawings, the numeral 2 designates a generally cylindrical container having a heat insulating lining 4. A dust collecting cone or hopper 6 is provided at the lower end of the container for collecting dust and is provided with a discharge gate or valve 8. Gas to be cleaned is admitted to the container from a pipe 10 through a goggle valve 12 and diffuser 14. The diffuser 14 is a tapered box-like structure having ports 16 opening therefrom which direct the gas through steam coils 18. By reason of the steam coils 18, the entering gas may be maintained at a temperature no less than 200° or at least about 80° above the dew point which is approximately 120°. This prevents precipitation of any moisture and consequent clogging of the filter medium.

A manhole covered opening 20 may be provided in the container wall to permit interior inspection of the apparatus and installation and replacement of filter bags. Also a relief valve and stack 22 may be provided in the chamber wall to relieve the gas pressure in the cleaner and prevent damage to bags in case a "slip" in the blast furnace causes momentary high pressures.

Spaced above the diffuser 14 is the filtering apparatus proper composed of a plurality of cylindrical filter bags and sleeves 24 composed of glass and asbestos fabric (weave) mounted on wire frames 26 and secured thereto at a plurality of places by bands 28. Such framework prevents collapsing or wrinkling of the bags during cleaning and the cylindrical shape prevents collapsing due to the high pressures of the gas to be cleaned which is passed therethrough. Closures 30 are provided at the lower end of the frame and bags so that the gases to be cleaned pass from the outside of the bags to the inside. The frame and bag assemblies are suspended from a reinforced plate member 32 having apertures 34 therein to permit egress of the gases from the filter bags. The plate or support member 32 is carried by an upwardly extending spindle 36 having a bulbous enlargement 38 intermediate the end thereof. Below the bulbous portion of the spindle 36 is a wall 40 forming a roof for the gas cleaning chamber which is sealed off from the atmosphere by a stuffing box 42.

A yoke 44 engages the bulbous portion 38 of the spindle and carries the weight of the filter bag assembly on beams 46 and 48 through springs 50 and stop members 52. The portion of the total weight carried by the springs can be adjusted by bolts 54. Upper stop 56 prevents undue upward movement of the assembly in case of a sudden increase in gas pressure. A sleeve hammer 58 mounted around the upper portion of the spindle 36 is reciprocably carried on guide rods 60, downward movement of the sleeve being limited by an air cushion in the cylinder. Tapered guide rings 62 clamp the halves of the hammer together. The upper end of the hammer is connected to a piston rod 64 and in turn to a piston of a pneumatic cylinder 66 which is operable to bring a shoulder 68 on the inside of the hammer into forceful engagement with a head 70 on the spindle to jar the filter assembly.

A sealing ring 72 may be mounted between the filter assembly plate 32 and the filter assembly to provide a seal therebetween. There is also provided a flexible sealing ring 80 between the outer edge of the plate 32 and the wall 2 to permit vibration of the filter bag assembly and at the same time provide a seal between the lower portion of the chamber and the upper portion so that the gas is forced through the filter bags. The sealing ring 80, which may be composed of asbestos or other suitable material, may be secured to the plate 32 and a flange 82 on the chamber wall by rings 84.

An outlet pipe 73 is connected to the container between the upper end of the filter assembly plate 32 and the roof member 40 and is provided with a butterfly valve 74. Also an inlet pipe 76 supplied with a suitable valve 78 and pressure fan 80a enters into the container between the top of the filter assembly plate 32 and the roof 40 to supply clean gas thereto to inflate the filter bags during cleaning thereof.

In operation, gas is admitted to the cleaning chamber from the pipe 10 through valve 12 and the diffuser 14 after passing over steam coils 18. The temperature of the gases is thereby always maintained sufficiently above the dew point to prevent condensation, moistening and thereby lowering the efficiency of the filter bags. The gas then passes upwardly through the filter bags 24 and out the apertures 34 to the clean gas pipe 73. As the operation continues, dust collects on the exterior of the filter bags 24 causing an increase in resistance to the flow of gas therethrough. Automatic controls may be provided to periodically remove the dust in the following manner, it being understood that pressure responsive devices may be incorporated in these controls to inaugurate the cleaning cycle before the set period in case the flow resistance becomes too great. The control apparatus at the proper time closes valve 74, and opens valve 78 to admit clean gas to the upper portion of the filter chamber to inflate the filter bags 24. The pneumatic cylinder 66 is then operated to shake the filter bag assembly by the jarring contact of shoulder 68 on head 70 and, assisted by the inflation of sleeves having loosened the dust particles, removes the dust from the exterior of the bags. This jarring action may be repeated until the exterior of the bags is relatively free of dust. After this, the controls function to open valve 74 and close valve 78 to inaugurate a new cleaning cycle wherein the gases are cleaned in the manner set forth above.

It is also noted that the bags can be inspected by entering the container or chamber underneath the filter assembly through the manhole 20. This permits inspection of the filter bags and easy replacement thereof without removing other bags.

While I have shown and described one specific embodiment of my invention, it will be understood that this embodiment is merely for the purpose of illustration and description and that various other forms may be devised within the scope of my invention, as defined in the appended claims.

I claim:

1. A gas filter comprising a chamber, a vertically reciprocable support plate having a plurality of apertures suspended in said chamber and dividing it into upper and lower compartments, a seal between said support and the chamber wall, a plurality of elongated cylindrical bag supporting frames rigidly connected to the underside of said support plate in alignment with said apertures, heat resisting filter bags having closed lower ends mounted around said supports and secured thereto by a plurality of vertically spaced band members encircling and tightly clamping said bags to said supports whereby said bags are rigidly supported on said rigidly mounted frames to prevent flexure thereof during reciprocation of said reciprocable support to dislodge dust from said bags, and means for delivering gas to be cleaned into said lower compartment whereby it passes from the exterior to the interior of said bags and through said apertures into said upper compartment.

2. A gas filter comprising a substantially cylindrical chamber, a substantially circular vertically reciprocable support plate having a plurality of apertures suspended in said chamber and dividing it into upper and lower compartments, an annular seal between said support and the chamber wall, a plurality of closely spaced elongated cylindrical bag supporting frames rigidly connected to the underside of said support plate in alignment with said apertures, heat resisting filter bags having closed lower ends mounted around said supports and secured thereto by a plurality of vertically spaced band members encircling and tightly clamping said bags to said supports whereby said bags are rigidly supported on said rigidly mounted frames to prevent flexure thereof during reciprocation of said reciprocable support to dislodge dust from said bags, and means for delivering gas to be cleaned into said lower compartment whereby it passes from the exterior to the interior of said bags and through said apertures into said upper compartment.

3. A gas filter comprising a substantially cylindrical chamber, a substantially circular vertically reciprocable support plate having a plurality of apertures suspended in said chamber and dividing it into upper and lower compartments, an annular seal between said support and the chamber wall, a plurality of closely spaced elongated cylindrical bag supporting frames rigidly connected to the underside of said support plate in alignment with said apertures, heat resisting filter bags having closed lower ends mounted around said supports and secured thereto by a plurality of vertically spaced band members encircling and tightly clamping said bags to said supports whereby said bags are rigidly supported on said rigidly mounted frames to prevent flexure thereof during reciprocation of said reciprocable support to dislodge dust from said bags, means for delivering gas to be cleaned into said lower compartment whereby it passes from the exterior to the interior of said bags and through said apertures into said upper compartment and means in said lower compartment for maintaining gas delivered therein above the dew point thereof.

FRED E. KLING.

REFERENCES CITED

The following references are of record in the file of this patent:

UNITED STATES PATENTS

| Number | Name | Date |
| --- | --- | --- |
| 1,781,430 | Blaney | Nov. 11, 1930 |
| 1,806,513 | Straus-Scharina | May 19, 1931 |
| 1,928,670 | McCrery | Oct. 3, 1933 |

FOREIGN PATENTS

| Number | Country | Date |
| --- | --- | --- |
| 208,670 | Germany | Apr. 3, 1909 |
| 332,475 | Great Britain | July 24, 1930 |
| 535,316 | Germany | Oct. 12, 1931 |